United States Patent Office

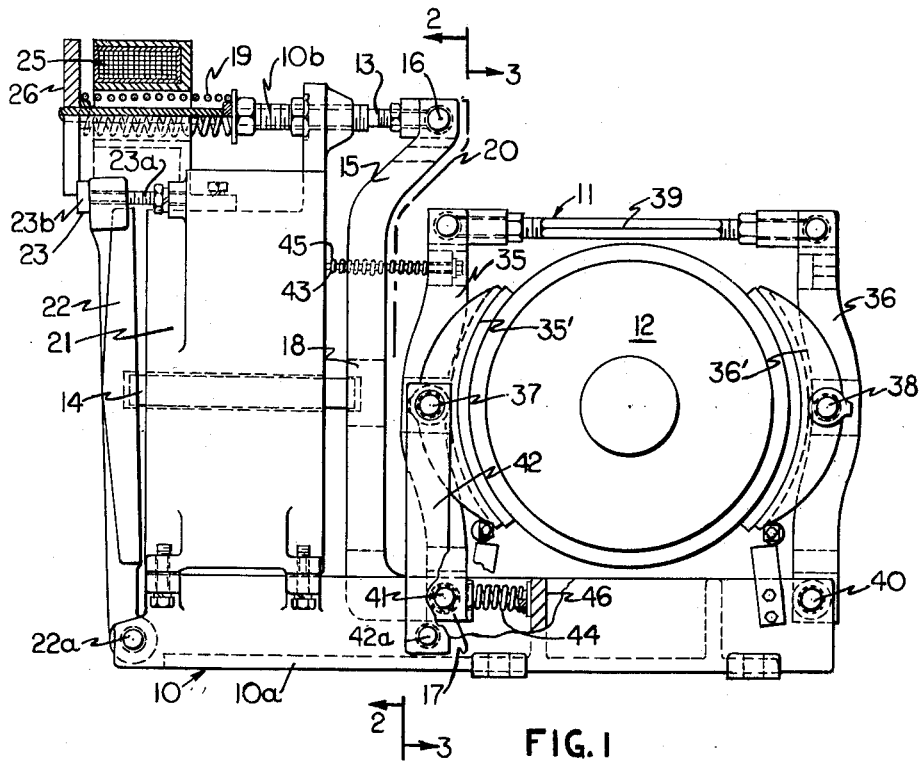
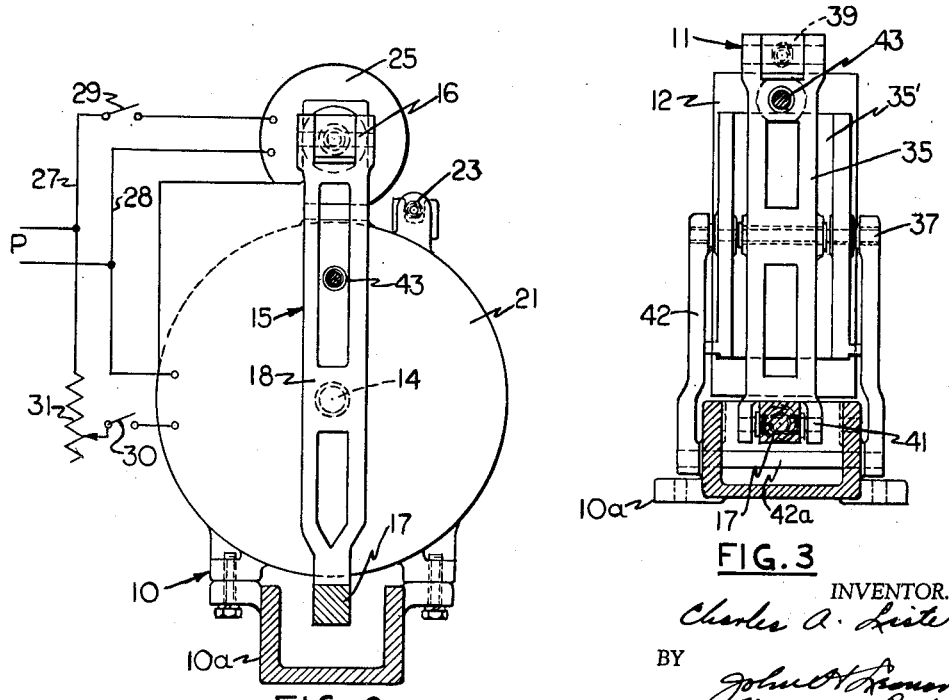

3,028,934
Patented Apr. 10, 1962

3,028,934
SPRING APPLIED BRAKE WITH ELECTROMAGNETIC RELEASE AND APPLICATION
Charles A. Lister, Shaker Heights, Ohio, assignor to Square D Company, Detroit, Mich., a corporation of Michigan
Filed Jan. 18, 1960, Ser. No. 2,953
4 Claims. (Cl. 188—171)

This invention relates to brakes, and more particularly to an industrial brake which is both released and applied electromagnetically and which is also applied automatically by mechanical means upon disconnection from or accidental failure of, electric power.

In the operation of many industrial mechanisms, for example, the bridges of electric overhead traveling cranes, it is desirable to control the degree of brake application electrically and yet to have full braking force applied automatically upon interruption or failure of electrical power. Heretofore, an electrically operated brake having these capabilities and also suitable for all industrial applications has not been readily available, and resort has had to be made to hydraulic or pneumatic means for controlling the brake torque or degree of brake application. Hydraulic and pneumatic brakes have numerous disadvantages and in their simpler forms cannot be used at all when the structure on which the brake is mounted moves materially with respect to the control station.

One of the objects of the present invention is to overcome the aforementioned difficulties encountered with prior brakes.

Another object of the present invention is to provide an electromagnetic brake which has a spring normally urging the brake to apply braking torque and electromagnetic means for overcoming that spring and also for electromagnetically applying braking torque.

Another object of this invention is to provide an improved industrial brake including electrically operated means for varying its torque electrically.

Another object is to provide an improved brake which is held applied by a spring under certain conditions, and which, under other conditions can be applied and released by the control of electromagnetic force without interference by the spring.

Another object is to provide an improved electromagnetic operating means for a spring-applied brake which, as long as electric power is available, is operable to nullify the applying force of the spring and concurrently is operable to apply and release the brake and to control the amount of its torque.

Another object is to provide an improved industrial brake which is held applied by a spring whenever electric power is not available, and which can be released and applied by control of electric power when power is available without the necessity of deactivating the spring during each release of the brake.

Other objects and a fuller understanding of the present invention may be had by referring to the appended claims defining the present new, novel and useful invention or discovery, to the following description of a specific means or method contemplated by the inventor for carrying out his invention, and to the accompanying drawings in which:

FIGURE 1 is an elevational view of an electromagnetic brake incorporating the features of the present invention;

FIGURE 2 is a cross-sectional view along the line 2—2 of FIGURE 1; and

FIGURE 3 is a cross-sectional view along the line 3—3 of FIGURE 1.

The following description of the attached drawings and the accompanying claims jointly set forth one or more modifications incorporating the present invention and the advancement in the art of motion translating devices. As used throughout the present description and claims, the specific terms used to identify the parts or components have been arbitrarily chosen to indicate commercially available parts or components which may be readily obtained to carry out the specific mode of the invention described herein, and they are to be interpreted in their broad sense wherein they include electrically or mechanically equivalent components which will provide the same functions as those mentioned herein.

It is understood that the present illustration is for the purpose of exemplification and is not intended in any way to limit the scope of the invention either to the specific application illustrated or to the functions obtained thereby.

The drawings illustrate an electromagnetic brake comprising a supporting structure 10 including a base 10a and work receiving means in the form of a brake setting and releasing device 11 mounted on the base 10a of structure 10 or engagement with a wheel 12. The releasing device 11 is operated by vertically spaced parallel first and second slide bars 13 and 14 slidably mounted in the structure 10 above base 10a and with second slide bar 14 between first slide bar 13 and base 10a and an elongated member or operating arm 15 having a first end 16 connected to the first slide bar 13. Similarly the operating arm 15 has a second end 17 in close proximity with base 10a and connected to the brake setting and releasing device 11 and an intermediate portion 18 connected to the second slide bar 14. Interposed between the first slide bar 13 and an adjustable upper terminus 10b of the structure 10 is force exerting means in form of a brake setting coil spring 19 which normally urges the first end portion 16 in one direction, to the left in FIGURE 1, from a first position illustrated by phantom or dash-dot line 20 to a second position, illustrated by solid lines. Also supported by the structure 10 as a location between base 10a and bar 13 and along side of brake setting and releasing device 11 is a first energizable electromagnetic device comprising an enclosed energizable coil 21 and an armature 22 pivoted by a pivot 22a to the structure 10 at base 10a for limited pivotal movement in accordance with an adjustable stop 23. In this instance the stop 23 is in the form of a bolt 23a threaded into structure 10 at the top of coil 21 and terminating in a head 23b which is abuttable by the armature 22 to limit pivotal movement of armature 22 to the left in FIGURE 1. The second slide bar 14 extends through the energizable coil 21 and engages the armature 22 so that when the energizable coil 21 is in an unenergized condition, the armature 22 resists movement of the second slide bar 14 in a first direction (to the left in FIGURE 1) beyond a selected position defined by the armature 22 abutting head 23b (as illustrated in solid lines in FIGURE 1). When the energizable coil 21 is in an energized condition, the armature 22 moves the second slide bar 14 in a direction (to the right in FIGURE 1) opposite to the said first direction and away from the selected position.

Mounted above the coil 21, and thus on structure 10, is a second energizable electromagnetic device including a coil 25 and a plate 26 secured to an end of the first slide bar 13. The coil 25, when in an unenergized condition, causes the plate 26 to be free from affecting movement of said first slide bar 13 and thereby movement of said first end portion 16. The coil 25, when in an energized condition, is incapable of overcoming the urging of the spring 19 and thus is unable to cause the plate 26 to move the first end portion 16 of the first position. In addition, coil 25, when energized, is capable, when the first end portion 16 is in said first position and the plate 26 completes a magnetic loop for the coil 25, of retaining the first end portion 16 in said first position.

As illustrated in FIGURE 2, the first and second energizable electromagnet devices, including coils 21 and 25 are selectively energized from suitable power lines 27 and 28 extending from a source of power P. Interposed in line 27 between the source of power P and coil 25 is a switch 29. Interposed in line 27 between the source of power P and coil 21 is a switch 30 and an adjustable resistor 31. These switches 29 and 30, and resistor 31 jointly define control means interconnected between the source P and said coils 21 and 25 and cooperate therewith to cause coil 21 and coil 25 to be simultaneously unenergized when the switches 29 and 30 are open so as to cause the spring 19 to cooperate with the brake setting and releasing device 11 to set the brake. When the switches are operated in such manner that closure of switch 30 causes energization of the coil 21, the armature 22 pushes arm 15 against the urging of the coil spring 19 to move the first end portion 16 from the second position (in solid in FIGURE 1) to the first position (in phantom in FIGURE 1). During this movement, arm 15 pivots about end 17 with the armature 22 moving slide bar 14 and the intermediate portion 18 therewith to the right in FIGURE 1. This causes the brake setting and releasing device to continue the brake in its illustrated brake setting condition and moves the plate 26 against the coil 25. Energizing coil 25 while the plate 26 is against the coil 25 thereafter holds 16 in the first position (in phantom in FIGURE 1) so long as the coil 25 is continuously energized. While coil 25 is energized and the plate 26 is against the coil 25 and the first end portion 16 is in the first position (illustrated by phantom line 20) switch 30 may be opened to de-energized the coil 21 and release the brake. Also, while the coil 25 is energized to hold the first end portion 16 in the first position, the resistor 31 may be adjusted to adjust the energization of the coil 21. While the first end portion 16 is in the first position, the adjustment of the coil 21 causes adjustment of the force exerted by the end 17 or the brake setting and releasing device 11 and thus adjusts to the torque setting of the brake. During this operation, the arm 15 is pivoted about the first end portion 16 by movement of the slide bar 14 to urge the end 17 to the right.

The brake setting and releasing device 11 is of the common shoe brake construction. As illustrated in FIGURE 1, it has a pair of shoe carrying members 35 and 36 disposed on opposite sides of the wheel 12. Mounted in the center of these member 35 and 36 are the wheel engaging brake shoes 35' and 36' respectively which are positioned on diametric opposite sides of the wheel 12 for frictional engagement therewith. The shoe 35' is pivotally mounted at the center 37 of member 35 and shoe 36' is pivotally mounted at the center 38 of member 36. The upper ends of the members 35 and 36 are interconnected by an adjustable tie-rod 39. The lower end of member 36 is pivotally connected by a pivot 40 to the base 10a and the lower end of member 35 is pivotally connected by a pivot 41 to the end 17. In addition, a rocker arm 42 is pivoted at its lower end by a pivot 42a to the base 10a and has its upper end pivoted to member 35 and shoe 35' at the center 37.

Correct shoe engaging and shoe releasing positions of the shoes relative to the surface of the wheel 12 are maintained by an adjustable stop formed by a stop bolt 43, spring 45, and by adjusting the length of the tie-rod 39. The adjustable stop bolt 43 extends between the upper end of member 35 and structure 10, and more specifically is threaded into the case of the coil 21 at a location between slide bars 14 and 13. A coil spring 45 surrounding bolt 43 and compressed between member 35 and coil 21 takes up any slack in the adjustment and urges the member 35 against the head of the bolt 43. The spring 44 extends between the end 17 and a portion 46 in base 10a and urges end 17 towards the coil 21, i.e., to the left in FIGURE 1, to move the shoes to a brake released position when the coil spring 19 is overcome and the coil 21 is not energized.

Summarizing, therefore, the shoe carrying element 35 comprises a first element which is operable, when moved in one direction, to apply the brake. The slide bar 13 provides a second element movable in opposite directions and connected to the operating arm 15, which is an intermediate element. The pivot 41 provides a first pivot means which connects the operating arm or intermediate element 15 at one end to the first, or shoe carrying, element 35. The pivot 16 provides a second pivot means which connects the opposite end of the operating arm or intermediate element 15 to the slide bar or second element 13. The spring 44 provides a first resilient means which normally urges the shoe carrying member or element 35 toward the brake releasing position. The slide bar 14 provides the shiftable pivot means which is operatively connected to the arm 15 or intermediate element. The spring 19 provides a second resilient means which urges the slide bar 13 or second element to a brake applying position. The coil 21 and armature 22 provide a first electromagnetic means and the coil 25 and armature 26 provide a second electromagnetic means. It is apparent from the foregoing that the specific shape or form of the particular parts thus described are not critical.

In carrying out the objects of the present invention, it is particularly noted that the present device operates in a very safe manner. The same coil is energized to electrically apply braking torque that is used to overcome the spring which applies braking torque. Thus, in order to overcome the spring so that the brake may be operated as an adjustable torque brake with the spring applied braking torque released, the coil which will adjustably apply braking torque must be operated. The safety feature is obtained because the spring-applied brake cannot be released for electromagnetic adjustable torque operation until the electromagnetic braking action has been tested because it must be operated to release the brake. In this way, the objects of the present invention have been met.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A brake operating mechanism comprising a first element operable when moved in one direction to apply a brake and when moved in the opposite direction to release the brake, a second element movable in opposite directions, selectively, an intermediate element, a first pivot means connecting the intermediate element at one of its portions to the first element for rocking relative thereto about a first pivotal axis at said one portion in all positions of the first element, a second pivot means connecting the intermediate element at another of its portions, which is spaced from said one portion, to the second element for rocking relative to the second element about a second pivotal axis at said other portion which second pivotal axis is parallel to the first pivotal axis in all positions of the second element, a first resilient means normally urging the first element toward brake releasing position, shiftable pivot means operatively connected to the intermediate element in spaced relation to both of said pivotal axes and providing, for the intermediate element, a shiftable rocking axis in spaced relation to, and parallel to, said first and second pivotal axes, a second resilient means urging the second element to a brake applying position by movement of the second element in one of said directions wherein it rocks the intermediate element about said shiftable pivot means in a direction to move the first element to brake applying position, a first electromagnetic means operatively connected to the shiftable pivot means and operative when energized to shift the shiftable pivot means in a direction for swinging the itnermediate element about the first pivotal axis against the resistance of the second resilient means to place the second resilient means in a condition in which, so long as it is maintained in said condition, it is inoperative to move the second element in the brake applying direction, a second electromagnetic means which, when energized, is incapable of moving the second element against the resistance of the second resilient means, but is capable of holding the second element in position for maintaining said condition after the condition has been established by the first electromagnetic means, and means for varying the degree of energization of the first electromagnetic means for shifting the shiftable pivot means to different positions depending upon the degree of energization of the first electromagnetic means.

2. A brake applying mechanism comprising a frame, a first means operable when moved in opposite directions to apply and release a brake selectively, spring means having one end in fixed position relative to the frame and connected at the opposite end to said first means for operating the first means for applying the brake, electromagnetic holding means having a portion secured in fixed position on the frame and including a coil and an armature cooperable with the coil and operatively connected to the spring means for holding the spring means in inoperative condition when the armature is in a holding position in close proximity to the coil while the coil is energized, said coil being inoperative, while energized, to move the armature to said holding position from a more remote position against the resistance of the spring means, an operating electromagnetic means having a portion mounted on the frame and operative, when energized, to move the first means to the position which it must assume in order for the brake to be released and concurrently to move the armature to holding position against the resistance of the spring means.

3. The mechanism according to claim 1 wherein said one portion of the intermediate element is at one end of the intermediate element and said other portion is at the opposite end of the intermediate element, the shiftable rocking axis is located between the ends of the intermediate element, and the first electromagnetic means includes an armature operatively connected to the shiftable pivot means.

4. The mechanism according to claim 1 wherein said second electromagnetic means includes a coil and an armature responsive to said coil and movable by the first electromagnetic means to a predetermined position and normally spaced from the coil a distance rendering the coil inoperative to move the armature, and said coil being operative to hold the armature in the predetermined position into which it has been moved by energization of the first electromagnetic means.

References Cited in the file of this patent

UNITED STATES PATENTS 2,558,594    Tritle _____ June 26, 1951